Figure 1:
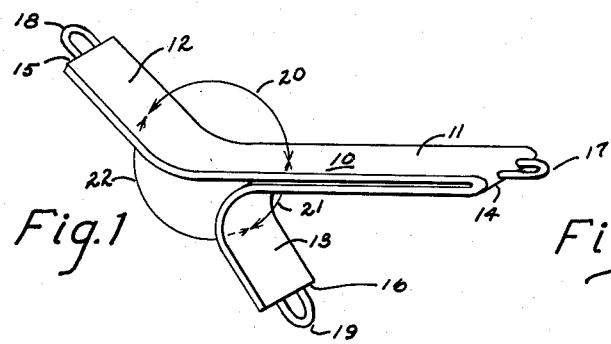

June 26, 1962     E. J. KNAPTON     3,040,468
FISHING LURE
Filed March 3, 1958

INVENTOR.
Earl J. Knapton
BY
Frederick C. Meyers
ATTORNEY

United States Patent Office 3,040,468
Patented June 26, 1962

3,040,468
FISHING LURE
Earl J. Knapton, 508 S. 2nd St., Bemidji, Minn.
Filed Mar. 3, 1958, Ser. No. 718,852
1 Claim. (Cl. 43—42.23)

This invention relates to a fishing lure, and more particularly to a wobbling, swaying type of lure.

There are numerous lures which have been proposed to simulate live bait such as small fish. These lures are generally in the nature of plugs provided with a concave or flat surface near the front which will give it a characteristic swimming action when drawn through water. The body of the lure is usually provided with several gangs of hooks, any one of which may engage and retain a fish which strikes at it.

Another class of lures utilizes fishhooks which are intended to be baited with live bait such as minnows, and are provided with bright, concave spoon elements which are adapted to rotate and flash attention to the minnow. Where live bait is employed, the bait generally becomes inactive in a very short time, losing the power to attract game fish through its own movements. This is particularly true where the live bait is cast by means of rod and reel, or where it is trolled from a moving boat. An inactive or dead minnow may still be good bait but is not as inviting to game fish as live bait which has movement in the water. Thus, fresh minnows which can dart about when baited on a dropline or which may be utilized in other methods of still-fishing where the minnow is not subject to violent handling will constitute a better type of live bait lure. Still-fishing, of course, has its limitations in that the game fish must come to the location of the bait rather than the bait traversing underwater areas where the game fish may be lurking.

It is an important object of the present invention to provide a traveling lure including fish bait which will provide both attraction and action thereto whether or not the bait itself is immobile.

Another object of the invention is to provide a device which is adapted to be interposed between a baited hook and the fishing line, being so related to the baited hook as to impart a wobbling and swaying action thereto.

A further object of the invention is to provide a multi-vaned device having a plurality of fastening couplets, each couplet being capable of giving a different kind of movement to a baited hook when secured to one element of the fastening couplet and pulled through the water by the other fastening element.

Figure 2:
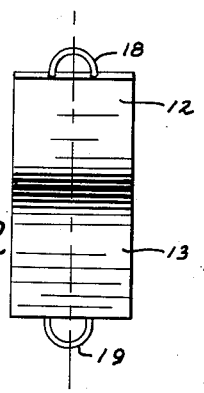
Figure 3:
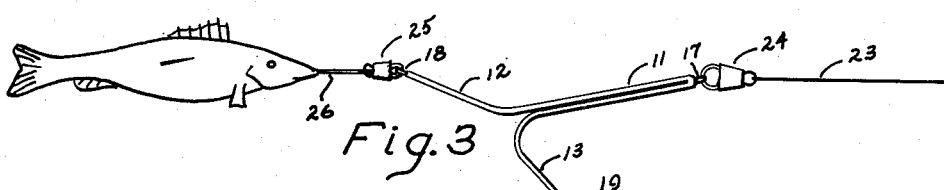
Figure 4:
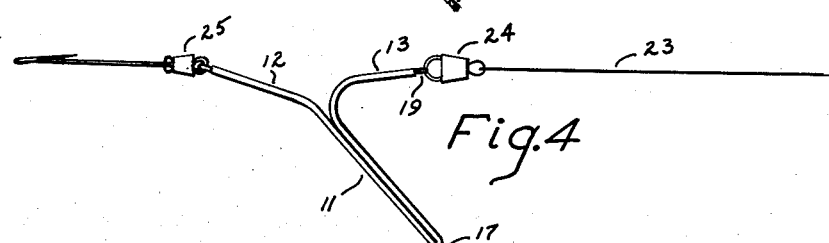
Figure 5:
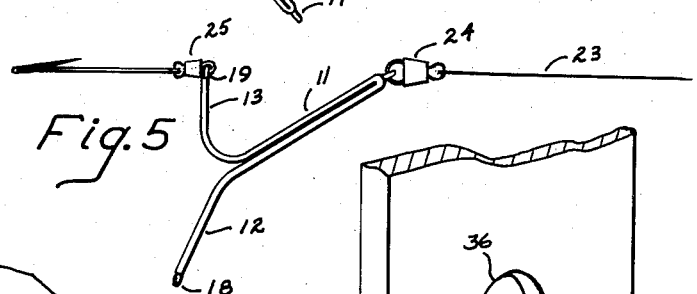
Figure 6:
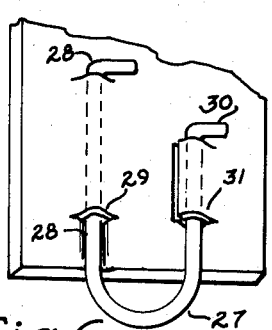
Figure 7:
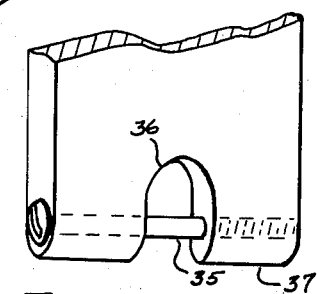

These and other objects and advantages of my invention will more fully appear from the following description, made in connection with the accompanying drawings, wherein like reference characters refer to the same parts throughout the several views and in which:

FIGURE 1 is a perspective view of my fishing lure;
FIGURE 2 is a rear elevation of the lure taken from the left of the position shown in FIGURE 1, indicating a plane bisecting the entire lure;
FIGURE 3 is a side elevation showing one arrangement of attachment of a baited hook and a fishline;
FIGURE 4 is a view showing another combination of attachments;
FIGURE 5 shows still another combination of attachments;
FIGURE 6 is an enlarged segment of the ends of one of the vanes showing details of the snap hook fastener; and
FIGURE 7 shows another form of the invention utilizing a cross pin fastener at the outer end of the vane.

Referring now to the drawing, my fishing lure generally comprises a unitary body 10 which has three planar vanes 11, 12 and 13 extending generally outward, one from the other, in unsymmetrical pattern and all lying perpendicular to a plane passing through the unitary body 10 and bisecting the three vanes of the lure. The outer ends of each of the planar vanes 14, 15 and 16 are provided with respective fastening elements 17, 18 and 19.

It will be noted that each of the planar vanes 11, 12 and 13 are flat and of equal width and terminate abruptly in the edges 14, 15 and 16. The equal width of all the vanes makes it possible to construct the lure from a single strip of metal by folding the strip about one of the outer edges 14 and bending the strip against itself to form the vane 11. The respective ends 15 and 16 will then be bent divergently so as to cause one of the vanes to be longer than the other two. In the form shown, the vane 11 which is formed by the bent double medial portion of the strip was selected as the long vane and vanes 12 and 13 were selected as the shorter ones.

In order to obtain a variety of characteristic wobbling and swaying motions, the angles of the vanes may be varied one from the other. Thus, the included angle 20 between the vanes 11 and 12 is less than 180° but is greater than 90°. Similarly, the included angle 21 between the vanes 11 and 13 is less than 90°. Since the sum of the included angles must equal 360°, the third included angle 22 between the short vanes 12 and 13 will lie between 180° and 90°.

The fastening elements 17, 18 and 19 may be simple loops rigidly secured to the outermost edges of the respective vanes as previously described, in which case the fishline 23 must be provided with a snap hook 24 for engaging one of the loops 17 and a further snap hook element 25 must be interposed between the baited fishhook 26 and its associated loop 18.

Referring now to another form of fastener shown in the enlarged segment of FIGURE 6, I there utilize a spring wire 27 which may be bent in U-shape, as shown, one leg having an offset bend 28 and being crimped within a retainer 29 punched from the surface of each vane. The opposite end 30 of the spring wire 27 may releasably interfit with an ear 31 punched out of the surface of the vane but left in open and uncrimped engagement so that wire end 30 may be sprung therefrom when it is desired to secure either a hook or a line fastening element thereto.

A still further form of the invention is shown in FIGURE 7 wherein all the vanes are of one-piece construction such as may be cast from a mold and the fastening elements comprise pins 35 which are secured laterally of each of the vanes, the pins spanning intermediate notches 36, formed inwardly of each vane edge 37, as previously set forth. The relationship of the vanes in all cases is unsymmetrical, as previously pointed out, and will give a variety of swaying motions and wobbling motions when utilized in the manner set forth herein.

In the use and operation of my lure, it will be noted that there are three fasteners and three end points of attachment, two of which may be utilized as a couplet for the purpose of securing the baited hook 26 and line 23 thereto in opposed relation. Referring to FIGURE 3, the line 23 is disclosed as fastened to the fastener 17 while baited hook 26 is secured to the fastener 18. Under this arrangement, the included angle between the vanes 12 and 11 will be large, whereas the included angle between vanes 13 and 11 will be small. Hence, the movement will be small and slow with the couplet thereshown. If the position of the line and the baited hook are reversed, then the respective angles remain the same but the angulation of the short vane 13 with respect to the direction of travel will be changed. The lure will give substantially the same movement but will assume a slightly different angle as it travels through the water.

With the arrangement shown in FIGURE 4, the line 23 is secured to fastener 19 of the vane 13 and baited hook 26 is secured to the fastener 18 of vane 12. In this case, the long vane 11 will depend from the lure as it is drawn through the water. The distance between the fasteners 18 and 19 is shorter than when utilizing the couplet arrangement of FIGURE 3 and, hence, a faster action is obtained. Furthermore, the long vane 11 offers a greater surface to the water as the lure and baited hook are drawn therethrough. Here, again, the baited hook and line may have their positions interchanged which will give much the same action but which will cause the lure to travel at a somewhat different angle.

FIGURE 5 shows a still further arrangement of fastening wherein the line 23 is secured to the fastener 19. Vane 12 and its fastener 18 depend freely from the device and are not utilized for fastening the hook or the line in this instance. The space between the vanes 11 and 13 is shorter and, hence, a very rapid action is obtained when the lure and bait are pulled through the water. As before, the line and baited hook may be interchanged in their positions to retain the fast action but present the lure at a somewhat different angle as it travels through the water.

As noted above, the baited hook 26 is given a life-like movement which is imparted directly to its bait whether the bait be living or dead. Thus, a minnow which has become inactive will still appear to have considerable vigor when utilized with my lure. It is, therefore, desirable to have the baited hook secured to its proper fastener so that the movement of the lure will be transmitted in full force and effect to the bait. If the bait extends farther to the rear as where a leader may be interposed between the baited hook and one of the fasteners, then the device takes on more of the character of a spoon hook with the bait merely trailing and not being an active part thereof.

I have found my lure to be successful in all types of fishing, even in "jigging" where the lure and baited hook are given vigorous short jerks without traversing appreciable forward travel through the water. The device has been utilized successfully for trout and other fish found in streams as well as those which frequent larger bodies of water.

It will, of course, be understood that various changes may be made in the form, details, arrangements and proportions of the parts without departing from the scope of my invention as set forth in the appended claim.

What I claim is:

A fishing lure adapted to be interposed between a baited hook and a fishline which comprises, a unitary body having three planar vanes extending generally outward one from the other, two of said vanes each being shorter relative to the third, the included angle between one of said shorter vanes and the long vane being less than ninety degrees and the included angle between the other short vane and said long vane being greater than ninety degrees but less than one hundred eighty degrees, all of said vanes lying substantially perpendicular to a plane bisecting the lure, and a fastening element positioned adjacent the outer end of each of said vanes.

References Cited in the file of this patent

UNITED STATES PATENTS

| | | |
|---|---|---|
| 395,103 | Wood | Dec. 25, 1888 |
| 2,518,031 | Lane | Aug. 8, 1950 |
| 2,590,633 | Lucas | Mar. 25, 1952 |
| 2,616,205 | Mason | Nov. 4, 1952 |
| 2,639,537 | Wagner | May 26, 1953 |
| 2,698,494 | Larsen | Jan. 4, 1955 |
| 2,755,591 | Beckesh | July 24, 1956 |
| 2,892,280 | Davis | June 30, 1959 |